INVENTORS
CHARLES W. HARGENS
& GEORGE A. SMITH

Sept. 18, 1962 C. W. HARGENS ETAL 3,054,296
APPARATUS FOR SPECIFIC GRAVITY MEASUREMENTS
Filed Jan. 16, 1958 3 Sheets-Sheet 2

INVENTORS
CHARLES W. HARGENS
& GEORGE A. SMITH
BY

ATTORNEYS

United States Patent Office 3,054,296
Patented Sept. 18, 1962

3,054,296
APPARATUS FOR SPECIFIC GRAVITY MEASUREMENTS
Charles W. Hargens, Enfield, and George A. Smith, Philadelphia, Pa., assignors to Louis Forman, Jenkintown, Pa.
Filed Jan. 16, 1958, Ser. No. 709,393
7 Claims. (Cl. 73—453)

This invention relates to apparatus for specific gravity measurements of liquids and particularly to apparatus for the rapid determination of proof of alcoholic liquors.

For simplicity of description the apparatus constituting the invention will be particularly described with reference to the determination of proof of distilled spirits, though it will be evident that it is applicable to the determination of density or specific gravity of liquids generally, whether heavier or lighter than water, giving indications in terms of any desired units applicable to the liquid involved, for example, proof or alcoholic content in the case of alcoholic liquors, specific gravity, degrees Baumé, sugar or salt content, in the case of solutions, or the like.

Proof in the case of alcoholic liquors or specific gravity in various units in the case of other liquids, are generally measured through the use of hydrometers, the readings of which must be corrected for temperature in order to give a measure of what is usually desired, namely the content of some constituent of the liquid. A high degree of accuracy may be thus obtained but, as will be evident, direct reading is usually not accomplished. In particular, a high degree of accuracy of reading is required in the case of alcoholic liquors both for control and determination of tax liability in view of the high rate of taxes applicable to the alcoholic content thereof. Furthermore, relatively large quantities of alcoholic liquors must be used in making hydrometer determinations and wastage is a matter of considerable expense.

It is the general object of the present invention to provide apparatus for the determination of specific gravity having a high accuracy and utilizing only a small quantity of the liquid in the determination, the quantity being so small that it may be readily brought to a standard temperature with resulting indication or recording of the desired measurement value of the quantity desired reduced to some standard temperature conditions. In the case of alcoholic liquors, for example, a proof reading may be obtained referred to the standard temperature required for reference.

In particular, the invention involves the use of a member subject to buoyant forces by the liquid associated with means for detecting to a high degree of accuracy a particular position thereof in association with other means for applying a balancing force to maintain the member, at least on the average, in its predetermined zero position. The member subject to buoyant forces may be either heavier or lighter than the liquid which it displaces, and for convenience will be hereafter referred to as a "float" even though it may be heavier than the liquid.

The present application is particularly directed to apparatus of the type disclosed in our prior application, Serial No. 546,479, filed November 14, 1955. In particular, the invention relates to a highly desirable form of the general apparatus disclosed in said prior application. In accordance with the present invention a highly stable and accurate apparatus of this type is provided by a particular assembly of elements, whereby determinations of specific gravity may be very accurately made.

A further object of the present invention is the provision of a transistor circuit having proper response characteristics for the determination of specific gravity.

The foregoing general objects as well as others relating to details of construction and operation will become apparent from the following description, read in conjunction with the accompanying drawings, in which.

Figure 1:
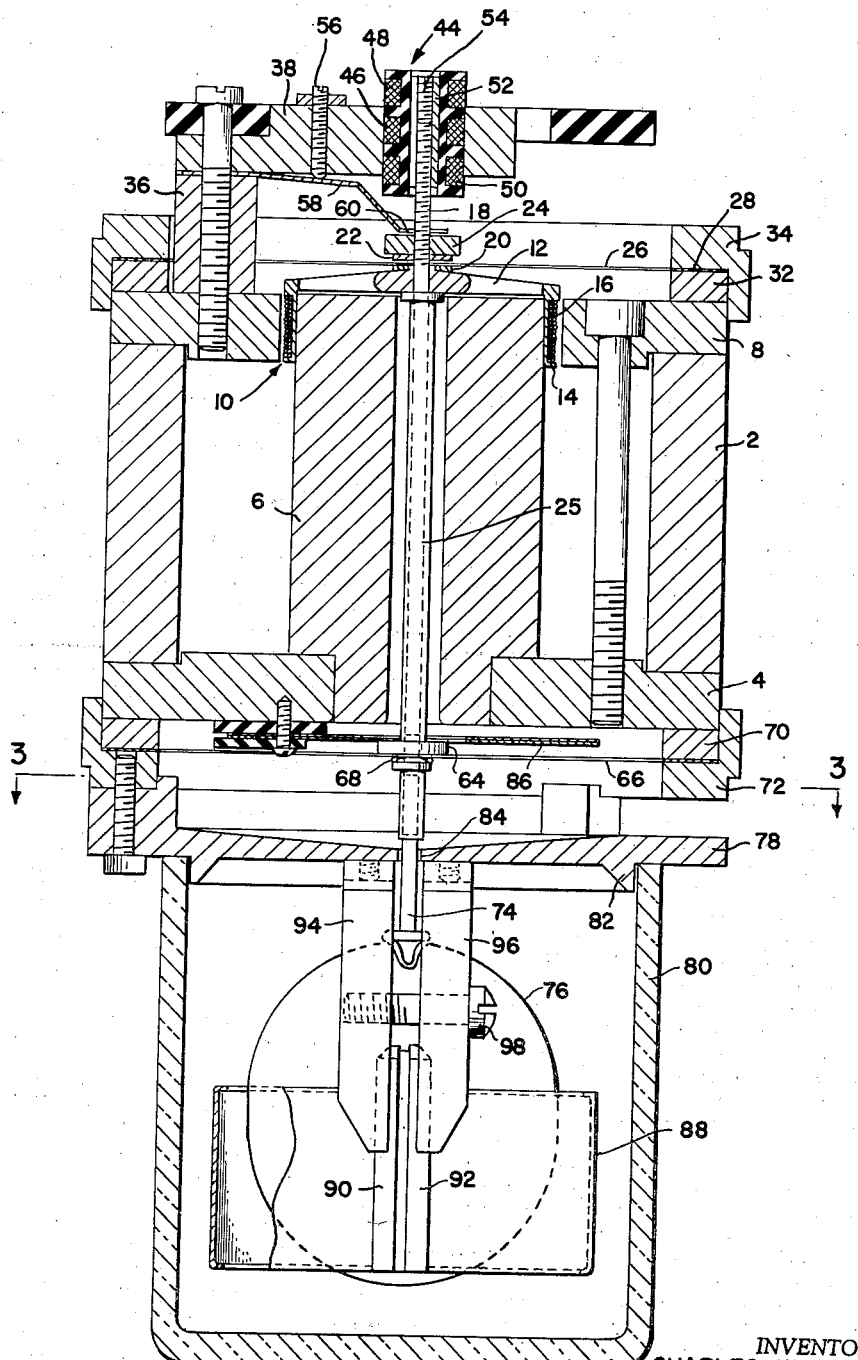
FIGURE 1 is a vertical section, taken on the plane indicated at 1—1 in FIGURE 2, showing the main operating parts of the apparatus.
Figure 2:
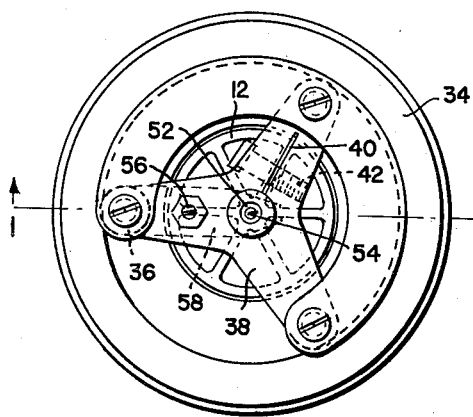
FIGURE 2 is a plan view of the parts shown in FIGURE 1.
Figure 3:
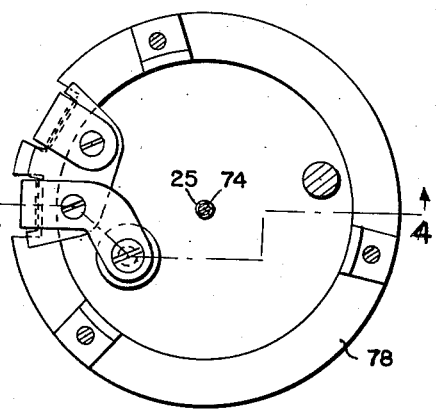
FIGURE 3 is a transverse section taken on the plane indicated at 3—3 in FIGURE 1.

Referring first to FIGURE 1, there is illustrated therein the assembly of the major mechanical parts of the apparatus.

Figure 5:
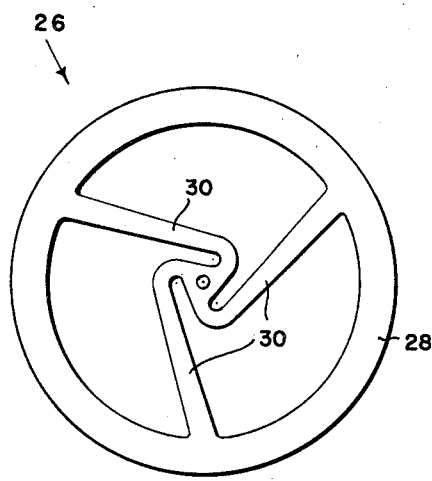
FIGURE 5 is a plan view of a flexible supporting means.
Figure 4:
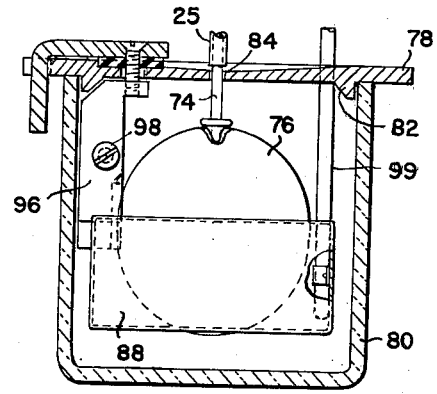
FIGURE 4 is a vertical section taken on the broken surface indicated at 4—4 in FIGURE 3.

A cylindrical magnet 2 providing a strong permanent magnetic field, the magnet being of Alnico or the like, is mounted upon a disc 4 of magnet steel which is provided with a central opening in which there is affixed a cylindrical core member 6 also of magnet steel. An annular plate 8 mounted on top of the magnet 2 and also formed of magnet steel provides with the core 6 an annular gap 10 for the reception of a balancing coil. A member 12 which is of light webbed construction and formed, for example, of aluminum, provides a spool extension 14 on which is wound the balancing winding 16 the terminals of which (not shown) are brought through highly deformable leads to suitable electrical terminals. As will later appear, these leads provide a very small and practically constant force to the movable coil mounting and do not appreciably affect the operation. The member 12 is provided with a central opening through which extends the threaded spindle extension 18. A pair of washers 20 and 22 and a nut 24 serve to clamp the member 12 against the upper end of the main portion 25 of the spindle which is desirably formed of a tube of brass. This arrangement also serves to clamp the inner portion of a very thin spider 26 which comprises, as shown in FIGURE 5, arms 30 extending inwardly, but not radially, from a rim 28 clamped between a pair of rings 32 and 34. Supporting members 36 serve to mount a frame spider 38 one of the arms of which is slitted as indicated at 40 both to interrupt eddy currents and to provide resilience for clamping by means of an insulated screw 42 the coil mounting spool of a differential transformer indicated at 44. The spool of this transformer carries a central primary winding 46 and a pair of symmetrically arranged secondary windings 48 and 50. Through the central bore of the spool there is arranged to move, with wall clearance, a core member 52 consisting of an internally threaded tube of magnet steel which is longitudinally slitted to prevent the flow of eddy currents. The core member 52 is threaded on the spindle extension 18 and locking in fixed axial position is effected by a set screw 54.

A screw 56 threaded into the spider 38 and provided with a locking nut is arranged to deflect a spring 58 which is clamped between the spider and the one of the members 36 and is provided with a bifurcated end 60 embracing the screw 18. By adjustment of the screw 56 there may be provided, during operation, a limited range of movement of the spindle and the parts carried thereby between the spring and the upper end of the core member 6. For transportation purposes the spring 58 may be deflected downwardly to act as a clamp on the spindle.

At its lower end the spindle tube 25 is provided with a flange member 64 which has a downward reduced extension passing through a central opening of a spider 66 which is identical with the spider 26 previously discussed and is clamped between the rings 70 and 72. A snap ring 68 received in a groove in the reduced end of the member 64 serves to confine, but loosely, the spider 66, the loose arrangement being provided so as to avoid the setting up of any stresses during movement of the spindle. The spiders 26 and 66 are so arranged as to maintain the spindle 25 in an axially centered position and are made of thin brass stock so as to offer extremely small restraint to the spindle assembly when it is in its normal position in which, as will appear, there should be a substantially complete balance of the outputs from the secondaries 48 and 50 of the differential transformer.

The tubular lower end of the spindle is arranged to receive, with retaining friction, the pin 74 which is cemented in the upper end of a float 76. The term "float" is applied to this element 76 with the understanding that under some conditions it may not actually float by reason of its assembly being lighter than the liquid in which it is immersed for measurement, since, as will appear, buoyancy alone is involved. In the apparatus specifically indicated, the float 76 and its stem 74 may be assumed to float in the liquid undergoing measurement so that an upward force is exerted on the spindle assembly. The arrangement could, however, be reversed. The stem 74 is desirably of quite small diameter so that its variable relationship to the surface of the liquid is negligible for reasonable errors in the volume of liquid in vessel 80.

A cover plate 78 is arranged to substantially close the vessel, for example, of glass, 80 which contains the liquid undergoing measurement, the cover being provided with a flange 82 which is located within the lip of the vessel 80 when the latter is in operation position. A central opening 84 clears the pin 74. The cover is desirable to prevent loss of volatile constituents of the liquid undergoing measurement.

A heater 86 in the form of a split arcuate ring having terminal connections is provided in the vicinity of the spider 66 to provide in the region above the cover 78 a temperature higher than that of the liquid undergoing measurement. This insures against the formation of condensate of vapors from the liquid which might form droplets on the spindle, the spider 66, and other associated parts and which might provide a false weight for the moving assembly.

For the purpose of heating the liquid in the vessel 80 there is provided a resistance heater in the form of a thin ribbon 88 of stainless steel or other suitable material which at its ends is provided with plug members 90 and 92 spaced by insulation and receivable in a socket provided by members 94 and 96 which may be sprung together by an insulated screw 98 and which have external terminal connections to a source of heater current.

It may be noted at this point that the purpose of heating is to establish a definite temperature for the measurements above such ambient temperatures as may normally be encountered in use of the apparatus. For this purpose, a thermostat 99 is arranged to have its bulb immersed in the liquid undergoing measurement and controls through conventional circuitry the supply of current to the heaters 86 and 88 which may be arranged in series. Since the control arrangement is of usual type it is not detailed herein.

Alternatively, however, in the case of measurements of volatile liquids it may be desirable to establish a temperature for the liquid undergoing measurement which is lower than any ambient temperature which may be expected to exist. For this purpose, the receptacle 80 may be subjected to refrigeration, and the thermostat in such case would control the refrigeration to maintain the desired constant temperature.

Figure 6:
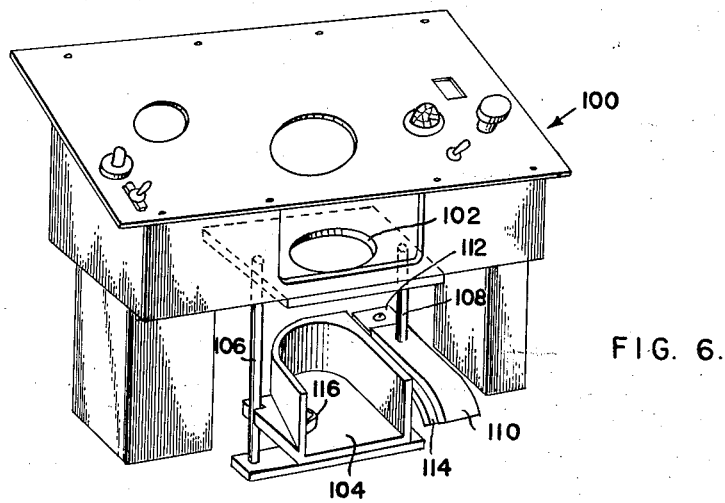
FIGURE 6 is a perspective view showing the housing and other elements of the apparatus.
Figure 7:
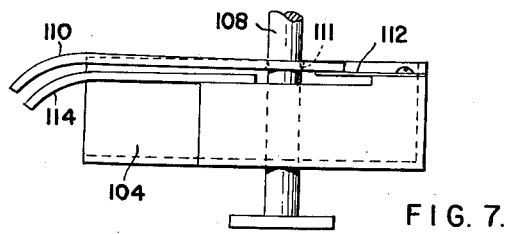
FIGURE 7 is a side elevation showing, in particular, means for locking a cup in adjusted position.

Referring now to FIGURES 6 and 7, there is indicated at 100 a housing which may assume any suitable form and which serves for the mounting of the elements already described and for enclosure of the electrical devices which are involved. The assembly shown in FIGURE 1 may be mounted in an opening as indicated at 102, and below this is an elevator 104 for the support of the cup 80, the elevator being guided for vertical movement along vertical rods 106 and 108. To provide convenient latching of the elevator in a lowered or raised position, it is provided with a fixed handle 114 and also with a movable handle 110 which is arranged to pivot by reason of a spring mounting 112, the handle 110 being provided with an opening 111 slightly larger than the rod 108, the rod projecting through this opening. As will be evident from FIGURE 7, the spring 112 is arranged to rock the arm 110 upwardly and in that case the edges of the opening 111 grip the rod 108 to retain the elevator in fixed position. To adjust it, it is only necessary to press the arms 110 and 114 together thereby providing a clearance so that the elevator may be moved vertically, being held in adjusted position when the arms are released.

A detent spring 116 may be provided within the elevator so that as the cup 80 is moved inwardly it will deflect the spring and then become releasably latched thereby. This will insure axial alignment of the cup with the float 76.

Figure 8:
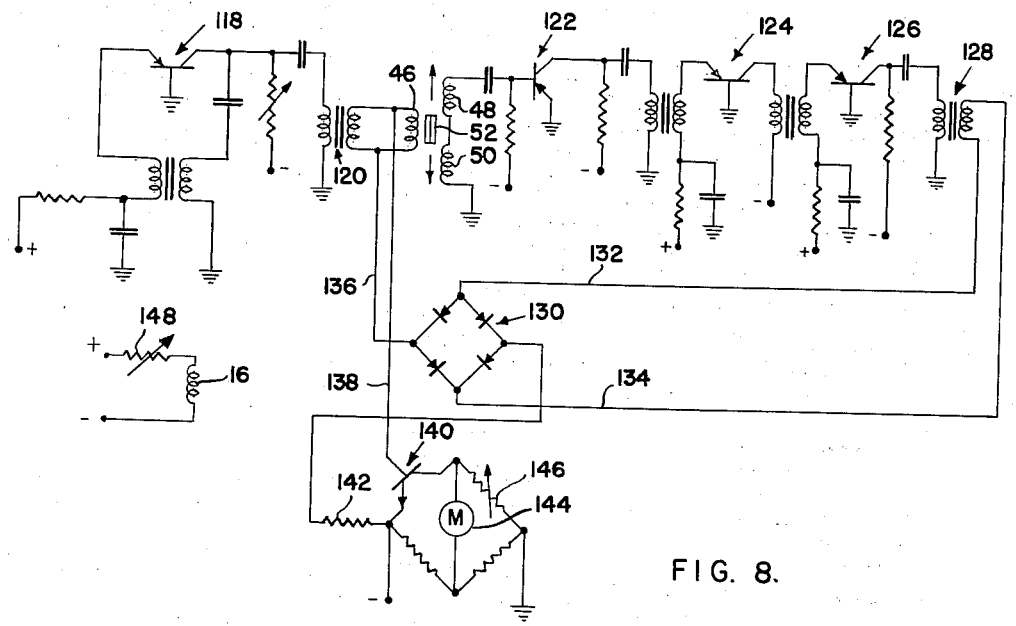
FIGURE 8 is a wiring diagram illustrating the electrical circuitry involved in the apparatus.

Referring to FIGURE 8, there is indicated at 118 a transistor oscillator which may generate any convenient reasonably high frequency such as 8 kilocycles per second, though the frequency is by no means critical and is primarily chosen fairly high merely to reduce the sizes of inductances which are involved in the circuit. The output of the oscillator is delivered through a transformer 120 to the primary winding 46 of the differential transformer. The secondary windings 48 and 50 are wound in opposed relationship so as to deliver no output when the core 52 is in a null position. That position corresponds to the condition of minimum mechanical restraint exerted on the parts associated with spindle 25 by the supporting spiders 26 and 66 which, with proper assembly of the apparatus serve merely to keep the spindle centered without the imposition of any appreciable vertical force. The movable core 52 is adjusted on the spindle to secure electrical balance when the force exerted mechanically is a minimum. The output from the secondary windings 48 and 50 is amplified through the conventional transistor amplifying stages 122, 124 and 126, and the output is delivered through transformer 128. The amplifier is desirably of very high gain so that even minute deviations of the core 52 from its null position will provide an output of considerable magnitude. The output from transformer 128 is delivered through connections 132 and 134 to a diode bridge 130 which also receives inputs from connections 136 and 138 from the secondary of transformer 120, the connection at 138 also involving the transistor 140 and resistor 142. The result of the diode bridge arrangement is to provide an output through transistor 140 which depends on the phase relationship between the reference signal delivered from the secondary of transformer 120 and the output from transformer 128. The output from the latter reverses in phase as the movable core 52 moves to the one side or the other of its null position. A meter 144 receives the output from this synchronous rectifier arrangement and is embodied in a conventional circuit for balancing it to null condition, the adjustment being through the use of a variable resistance 146.

For high sensitivity and repeatability of readings, the transistor circuit is supplied with current from a controlled power supply which is conventional and not illustrated. This same controlled power supply serves to provide current to the winding 16 through the adjustable resistance 148 provided by a precision potentiometer which is calibrated in terms of the specific gravity units which are of interest, e.g., proof in the case of alcoholic liquors, etc.

In the operation of the apparatus described, the liquid to be measured is placed in the cup 80, the cup being filled to a marking which may be etched in the cup. Filling to a definite level is desirable, but due to the small diameter of the spindle 74 relative to the size of the float 76, reasonable errors in the level are tolerable. The cup is then placed on the lowered elevator 104 and the elevator is raised until the cup engages the cover 78 with the result that the float 76 and part of the stem 74 become submerged. The apparatus is then permitted to stand for a sufficient time for temperature equilibrium at the desired temperature of measurement to be secured through the action of the heaters and the thermostat. Desirably, a visible signal is given indicative of the fact that the thermostat has reached the equilibrium temperature.

It may be then expected that the meter 144 will have a reading other than null by reason of the fact that taking into account the weights of the movable parts associated with the float, the buoyancy force exerted, and the downward force exerted by current through the coil 16 will result in a displacement of the core 52 from its null position. Adjustment is then made at 148 to vary the current through the coil 16 to secure a null indication on the meter 144. When this is secured the specific gravity in the units involved may be read from the setting of the variable resistance at 148.

Calibration adjustment may be readily achieved by making adjustment at 146 when some liquid of definite composition is contained in the cup 80, for example, distilled water which is conveniently used when measurements are being made of liquids which are water miscible. The zero adjustment is made, for example in the case of the use of distilled water, by adjusting the resistance at 148 to give an indication of a specific gravity corresponding to that of water at the temperature involved, the adjustment at 146 being then made to secure a null reading on the meter 144.

It will be evident that the apparatus may be used for the determination of specific gravity of liquids of densities greater or less than of water, and that cleaning of the parts which are engaged by the liquid may be readily effected. In particular, the float 76 may be easily removed from the spindle for cleaning purposes and this is also true of the heater 88 which is immersed in the liquid.

It will be evident that various changes in the embodiment of the invention may be made without departing from its scope as defined in the following claims.

What is claimed is:

1. In a density responsive device, a container for liquid, a member, means locating at least a major portion of the volume of said member in liquid in the container and mounting it for vertical movement under the buoyant action of the liquid, said means providing substantially no restraint to said member against vertical movement in a limited range, electromagnetic means of balanceable magnetic circuit type having a movable element thereof constituted by a part of said member and providing an electrical signal, a predetermined value of which corresponds to attainment of a predetermined position of said member within said limited range, phase sensitive means receiving said signal and providing a direct current output indicative of the position of said member relative to said predetermined position, means connected to said phase sensitive means responsive to and positioned by said output, said member including a stem extending above said liquid container, core means symmetrical about the axis of said stem, said core means including a permanent magnet and having an annular gap traversed by radial flux, and a winding about the axis of said stem and carried by said stem and located in said gap, and means providing current to said winding thereby to provide a vertical magnetic force directly to said member, and means indicating the magnitude of said force.

2. In a density responsive device, a container for a liquid, a member, means locating at least a major portion of the volume of said member in liquid in the container and mounting it for vertical movement under the buoyant action of the liquid, said means providing substantially no restraint to said member against vertical movement in a limited range but constraining it substantially entirely to vertical movement, electromagnetic means of balanceable magnetic circuit type having a movable element thereof constituted by a part of said member and providing an electrical signal, a predetermined value of which corresponds to attainment of a predetermined position of said member within said limited range, phase sensitive means receiving said signal and providing a direct current output indicative of the position of said member relative to said predetermined position, means connected to said phase sensitive means responsive to and positioned by said output, said member including a stem extending above said liquid container, core means symmetrical about the axis of said stem, said core means including a permanent magnet and having an annular gap traversed by radial flux, and a winding about the axis of said stem carried by said stem and located in said gap, and means providing current to said winding thereby to provide a vertical magnetic force directly to said member, and means indicating the magnitude of said force.

3. In a density responsive device, a container for a liquid, a member, means locating at least a major portion of the volume of said member in liquid in the container and mounting it for vertical movement under the buoyant action of the liquid, said means providing substantially no restraint to said member against vertical movement in a limited range, electromagnetic means of balanceable magnetic circuit type having a movable element thereof constituted by a part of said member and providing an electrical signal, a predetermined value of which corresponds to attainment of a predetermined position of said member within said limited range, said member including a stem extending above said liquid container, core means symmetrical about the axis of said stem, said core means including a permanent magnet and having an annular gap traversed by radial flux, and a winding about the axis of said stem carried by said stem and located in said gap, and means providing current to said winding thereby to provide a vertical magnetic force directly to said member, and means indicating the magnitude of said force.

4. In a density responsive device, a container for a liquid, a member, means locating at least a major portion of the volume of said member in liquid in the container and mounting it for vertical movement under the buoyant action of the liquid, said means providing substantially no restraint to said member against vertical movement in a limited range, electromagnetic means of balanceable magnetic circuit type having a movable element thereof constituted by a part of said member and providing an electrical signal, a predetermined value of which corresponds to attainment of a predetermined position of said member within said limited range, phase sensitive means receiving said signal and providing a direct current output indicative of the position of said member relative to said predetermined position, means connected to said phase sensitive means responsive to and positioned by said output, electromagnetic means for applying directly to said member a vertical magnetic force to locate it substantially in said predetermined position, and means indicating the magnitude of said force, said member having a portion extending above said liquid, and means for maintaining the region of the vicinity of the portion of said member above said liquid at a temperature higher than that of the liquid.

5. In a density responsive device, a container for a liquid, a member, means locating at least a major portion of the volume of said member in liquid in the container and mounting it for vertical movement under the buoyant action of the liquid, said means providing substantially no restraint to said member against vertical movement in a limited range, electromagnetic means of balanceable magnetic circuit type having a movable element thereof constituted by a part of said member and providing an electrical signal, a predetermined value of which corresponds to attainment of a predetermined position of said member within said limited range, electromagnetic means for applying directly to said member a vertical magnetic force to locate it substantially in said predetermined position, means indicating the magnitude of said force, said member having a portion extending above said liquid, and means for maintaining the region in the vicinity of the portion of said member above said liquid at a temperature higher than that of the liquid.

6. A device according to claim 3 in which said locating means comprises a pair of spider members, each of thin flat metal comprising a central area mounting said member, a fixed annular outer area, and a plurality of arms connecting said areas.

7. A device according to claim 5 in which said locating means comprises a pair of spider members, each of thin flat metal comprising a central area mounting said member, a fixed annular outer area, and a plurality of arms connecting said areas.

References Cited in the file of this patent

UNITED STATES PATENTS

| | | |
|---|---|---|
| 2,690,529 | Lindblad | Sept. 28, 1954 |
| 2,776,560 | Erath et al. | Jan. 8, 1957 |
| 2,780,101 | Kinkel | Feb. 5, 1957 |
| 2,820,364 | Bevins et al. | Jan. 21, 1958 |